3,437,427
OXYGEN SCAVENGING FROM CLOSED
CONTAINERS
Camilo Quesada, Park Ridge, Ill., assignor to Universal
Oil Products Company, Des Plaines, Ill., a corporation
of Delaware
No Drawing. Filed Mar. 16, 1966, Ser. No. 534,631
Int. Cl. B01j 11/06, 11/78; B01d 53/00
U.S. Cl. 23—2       7 Claims

ABSTRACT OF THE DISCLOSURE

Oxygen can be removed from a closed container by introducing hydrogen into such container and contacting the resulting gaseous mixture with a subdivided catalyst disposed within the container, said catalyst comprising iron and a platinum group metal composited with an inorganic oxide base and containing at least 6 moles of chlorine per mole of platinum group metal.

---

The present invention relates to a method for eliminating oxygen from a closed container. More particularly, this invention relates to an improved finely divided catalyst highly active for combining hydrogen with oxygen to remove trace amounts of the latter from a closed container.

In the packaging of foods or other materials detrimentally effected by the presence of oxygen, there may be a shortened "shelf-life" caused by the presence of oxygen within the package or container. In the packaging process, an inert atmosphere may be utilized. However, trace amounts of oxygen, carried into the container with the food or other product during the packaging process, or by reason of diffusion subsequent to packaging, may be present during and after the final sealing of the container to the detriment of the packaged material. Where the oxygen can be entirely removed or converted within the package after sealing, there can be a substantially longer life to the material, particularly in the food products field. The catalytic conversion of oxygen by combining the same with hydrogen appears to be the most desirable means suitable for rapid elimination of oxygen within a container and the present invention is directed to the use of an improved catalyst with respect thereto, said catalyst being disposed within the interior of a sealed package to effect oxygen scavenging therein at ambient conditions.

It is realized that there are many catalytic composites which may be utilized to accelerate the desired reaction for the elimination of oxygen from a closed container. However, not all catalysts provide a sufficiently high activity at ambient conditions. Prior associated work indicates that the platinum group metals, particularly palladium, possess an exceptionally high activity at the desired conditions when impregnated on finely divided particles such as finely divided particles of alumina, silica, or silica-alumina. It has now been discovered that this activity can be further enhanced by the inclusion of a certain promoter in the catalyst composite. It is therefore an object of this invention to provide a method for converting and eliminating residual oxygen from a small air-tight container at ambient temperature conditions, said method being based on an improved catalyst with respect thereto.

In one of its broad aspects the present invention embodies a method of scavenging oxygen from a closed container which comprises introducing hydrogen into said container and contacting the resulting gaseous mixture with a subdivided catalyst disposed within said container, said catalyst comprising iron and palladium in a mole ratio of from about 0.1 to 1.0 to about 2.5 to 1.0 composited with an inorganic oxide base material and containing at least 6 moles of chlorine per mole of palladium.

In a somewhat more specific embodiment, the present invention relates to a method of scavenging oxygen from a closed container and comprises introducing hydrogen into said container and contacting the resulting gaseous mixture with a subdivided catalyst disposed within said container, said catalyst comprising from about 0.1 to about 0.5% palladium together with about an equimolar amount of iron composited with alumina and containing from about 6 to about 10 moles of chlorine per mole of palladium. Other objects and embodiments of this invention will become apparent in the following detailed specification.

Inasmuch as the entrained air or oxygen content carried into a sealed container is presumably distributed substantially uniformly throughout the entire interior, it is necessary that the catalytic conversion of the oxygen take place in a quiescent state primarily by diffusion movement of the oxygen and hydrogen into contact with the catalyst. The catalyst may be positioned in a compact form or state in a central location within the interior of the container. However, from a practical aspect, the catalyst may be held or applied in a distributed manner along the interior surface of the container and thus provide an extended surface area for diffusion contact with the entrained oxygen and hydrogen within the package. The packaging of foods is frequently carried out by the use of small containers or cartons since they are useful in providing individual servings or a small number of servings. As a result, the entire quantity of food will be relatively close to the interior wall surface of the container and the catalyst is advantageously attached to or applied to at least a portion of the interior wall surface thereof.

The terms "sealed" and "air-tight" as used herein in connection with packaging or container means, shall have reference to the fact that such container means is formed or fabricated of a material, or utilizes a liner, that is at least generally considered impervious to the passage of air under normal handling conditions over an extended period of time and, in addition, such container utilizes a tight cover, adhesive seal, wrapping, or the like, that precludes air passage over an extended period of time. Such extended period of time should be beyond that which the goods would normally be used or consumed in the course of usual commercial conditions. The containers for incorporating the catalyst and holding the food or oxidizable goods may be actually completely sealed metal cans, glass jars, plastic containers, etc., or they may be made of plastic wrap materials, aluminum foil, or combinations thereof, as well as of paper or cardboard types of materials which in turn are coated or impregnated with wax or plastic to provide generally air impervious and water-proof surfaces.

Higher chlorine to palladium ratios than herein described may be employed in the catalyst of this invention and result in a desirably active catalyst. However, there is some hazard in handling the highly acid mixes and the 10 to 1 range appears to be generally optimum for providing the highly active catalyst. Also, while there are many refractory oxide base materials which are useful as catalyst supports, it appears that silica and alumina, or a combination thereof, are the more widely used because of adaptability, relative economy, physical characteristics, etc.

The term "alumina" as used herein is intended to include porous aluminum oxide in the various states of hydration and it is not intended to be limited to just one method of preparation.

Relatively fine particles of alumina may be prepared as microspheres by the spray-drying technique where there is the spraying of an alumina hydrogel slurry into a heated drying and collecting chamber. In addition, alumina precipitates of varying sizes can be prepared by adding ammonia to an aluminum salt solution, as, for example, aluminum chloride, aluminum nitrate, aluminum sulfate, etc. However, when the solution of such salt is contacted with ammonia in conventional precipitating procedures the pH may start at a low level and increase, or conversely, start at a high level and slowly decrease. As a result the precipitate usually has a low solids content and a final filter cake is made up of large agglomerate particles resulting from varying high localized pH levels during the precipitation procedure. Thus, in both the spray-drying and uncontrolled precipitating techniques it is preferable to grind or sieve the alumina to obtain the preferred small particles of less than 100 microns. A commercial alumina, known as Alcoa C-31, has a particle size primarily less than about 100 microns and appears to be a quite satisfactory support material.

It is not necessarily known why the ratio of chlorine to the platinum group metal contributes to improvement in catalyst activity, but the high ratio seems to improve the distribution of the active component onto the support. Also, it does not appear necessary to have a given amount of residual chlorine remain with the finished catalyst composite, although preferably on the alumina-palladium composite, a residual chloride content of at least about 0.60% by weight thereof seems desirable for an optimum high activity level.

Since in accordance with the present invention, the improved catalyst is to effect the combination of oxygen with hydrogen in a sealed container under ambient conditions, it is of course, necessary that the catalyst be sufficiently active at normal room or storage temperatures to insure the combination of the gases from diffusion movement. Also, since the catalytic material added to each sealed package will generally be lost upon the disposal of the container or package after it has been opened by the user, it is economically advisable to use minimum quantities of catalyst within each sealed container in order to reduce overall cost. Thus, where palladium, or palladium and platinum or other expensive catalytic component is utilized in the catalyst, then such materials will normally be utilized in small quantities which may comprise from about 0.01% to about 0.5% by weight of the catalyst composite. A small container of from 5 to 15 cubic inches by content may require from about one-tenth to about two grams of catalytic material while with larger containers there may be substantially greater quantities of catalyst required. The catalyst may, of course, be applied or positioned over one or more distributed areas within the container. The particular advantage of utilizing a finely divided support material is that it permits not only better catalytic contact but a more widely distributed surface area for equivalent weights of catalyst composite within any given size container.

Impregnation of the selected carrier material can be accomplished in any conventional or otherwise convenient manner. For example, the carrier material can be soaked, dipped, suspended or otherwise immersed in an aqueous solution of a soluble compound of the catalytic component, the concentration thereof being such as to insure a final catalyst comprising at least about 0.1% of the platinum group metal component. The iron promoter of this invention can be similarly impregnated on the carrier material either prior to the first mentioned impregnation, subsequent thereto, or concurrently therewith as from a common solution, the concentration of iron therein being such as to insure a final catalyst comprising iron and a platinum group metal in a molar ratio of from about 0.1 to 1.0 to about 2.5 to 1.0, an equimolar ratio being most suitable. Compounds of metals of the platinum group which can be thus utilized include preferably chloropalladic acid, but also ammonium chloroplatinate, platinous chloride, platinic chloride, etc., while suitable iron compounds include preferably ferric chloride, but also ferric bromide, ferric fluoride, ferric nitrate, ferric sulfate, ferric acetate, and the like. In any case the impregnating solution is subsequently decanted or evaporated from the impregnated carrier material which is thereafter heated to form the corresponding oxides of the metallic components.

Alternatively, the iron promoter can be incorporated in the carrier material, for example, by the addition of ferric chloride to an alumina sol from which the carrier material is formed. However, a catalyst prepared in this manner has been somewhat less effective than one prepared by the aforementioned impregnation procedures.

Although the precise means by which the catalytic component is combined with the carrier material is not known, it is believed that it exists in some physical association or chemical complex therewith. Thus, the palladium may be present as such, or as a chemical compound, or in physical association with the refractory inorganic oxide, or with the iron promoter component, or in some combination with both.

The catalytic impregnation may also be carried out when so desired in the presence of an additive component such as, for example, thiomalic acid, which appears to be effective in having the palladium impregnate the surface portion of the catalyst support whereby all of the activating component is available for carrying out the catalytic combination of the oxygen with the hydrogen. Varying amounts of thiomalic acid may be utilized. However, it has been found that about a 3 to 1 molar ratio of thiomalic to chloropalladic acid provides a desired form of surface impregnation.

A preferred catalyst preparation step also includes effecting the reduction of the impregnated, oxidized and dried catalyst composite in the presence of hydrogen or other reducing gas, with such reducing step being carried out for one or more hours at an elevated temperature of at least 345° C.

As indicated hereinabove, in order to insure an effective conversion and elimination of the residual oxygen content within a sealed container, at ambient conditions, it is necessary to insure the presence of hydrogen, for example, by adding a given quantity of hydrogen to the controlled atmosphere which is maintained for the packaging operations. The amount of added hydrogen shall be something more than the stoichiometric amount necessary to combine with the oxygen in the container in question and may be readily correlated with the average amount of oxygen which is found to be present in connection with a given packaging step for any given oxidizable material. In other words, preferably, the hydrogen shall be present in at least twice the molar quantity of the residual oxygen content for the particular packaging step whereby such oxygen may be rapidly catalytically combined with the hydrogen to form water vapor or droplets within the container upon diffusive movement of the gases into contact with the catalyst positioned interiorly of said container.

The following example is presented in illustration of the oxygen scavenging capacity of the catalyst of this invention at ambient conditions and of the beneficial effect of an iron promoter with respect thereto. It is not intended that said example shall serve as an undue limitation on the generally broad scope of the invention as set out in the appended claims.

A series of catalysts were prepared. In each case preparation was substantially the same except for the addition of controlled amounts of ferric chloride to the impregnating solutions to vary the amount of iron in the final catalyst composites. Iron concentrations of 0.1, 0.2, 0.5, and 1.0 weight percent were achieved. The palladium content in each case was maintained at 0.5 weight percent and the chloride content at about ten times the molar concentration of the palladium. Also, the support or base material was a finely ground (through 100 mesh) iron-free alumina.

The catalyst preparation consisted in the preparation initially of an impregnating solution by heating together at 60° C. 1.67 milliliters of an aqueous ferric chloride solution (1.20 wt. percent Fe), 6.5 milliliters of dilute hydrochloric acid, 0.166 grams of palladium chloride and 46.8 milliliters of water until all solids are dissolved. The impregnating solution thus prepared was poured over the alumina base material with stirring and the resulting slurry was evaporated to dryness over a 3 hour period by means of an infrared lamp. The impregnated alumina was further dried in air for 1 hour at 100° C. and thereafter oxidized in air for 2.5 hours at 450° C. After oxidation, the catalyst was reduced in a hydrogen atmosphere at 355° C. A nitrogen purge stream was used on the catalyst before and after the reduction step. In this particular case, the catalyst composite contained 0.1% iron. Catalysts containing 0.2, 0.5 and 1.0 weight percent iron were similarly prepared. The activity of the catalysts was determined with respect to a standard or reference catalyst prepared in the above manner but excluding iron. The activity number of a catalyst was determined by the formula $$\frac{t_r}{t_s} \times 100$$

where $t_r$ is the residence time for the reference catalyst and $t_s$ is the residence time for the sample in question that is required in each instance to reduce the oxygen level of a standard blend to a certain equilibrium level. Catalyst evaluation was accomplished by a procedure whereby the standard gas blend of oxygen, hydrogen and nitrogen (2.0% $O_2$, 5.0% $H_2$, and the balance $N_2$), was charged through a bed of the catalyst. The reactor effluent was analyzed for oxygen by means of a Beckman Model 777 laboratory oxygen analyzer and the residence time required to establish a reactor effluent containing 0.1% residual oxygen was determined. In spite of the limited contact time, e.g., 0.02 second for 91.5% $O_2$ conversion, it was necessary to dilute the powdered catalyst, both sample and reference catalysts, with additional powdered base material (alumina) in a ratio of 1 to 5 in order to lower oxygen conversion and increase oxygen in the exit gas within limits detectable by the oxygen analyzer. The reactor was a small tubular glass unit about 2.0 centimeters long with an 0.15 centimeter inside diameter, and incorporated a small piece of filter paper at each end thereof. The catalyst temperature was maintained at 32° C. and the oxygen analyzer reading taken after the oxygen concentration reached the desired equilibrium for at least 30 minutes.

The following tabulation of data was acquired in the above described manner:

| Percent iron: | Activity |
|---|---|
| 0 | 100 |
| 0.1 | 109 |
| 0.2 | 125 |
| 0.5 | 101 |
| 1.0 | 56 |

From the data presented it is readily apparent that iron has a promoting effect. The optimum effect is noted at the 0.2% iron level which amounts to about a 1 to 1 molar ratio with the palladium (0.5%). At the 1.0% level the iron has assumed a deleterious effect so that the iron comprising up to about 0.5% of the final catalyst composite at the 0.5% palladium level is suitably employed.

I claim as my invention:

1. In a method of scavenging oxygen from a closed container wherein hydrogen is introduced into said container and the resulting gaseous mixture is contacted with a subdivided platinum group metal catalyst disposed within said container, the improvement therein which comprises utilizing a catalyst which comprises palladium and from about 0.1 to about 2.5 moles of iron per mole of palladium composited with an inorganic oxide base material and containing at least 0.60 percent by weight of residual chlorine.

2. The method of claim 1 further characterized in that said catalyst comprises from about 0.1 to about 0.5% of said palladium.

3. The method of claim 2 further characterized in that said iron and palladium are present in about equimolar amounts.

4. The method of claim 3 further characterized in that said catalyst contains from about 6 to about 10 moles of chlorine per mole of palladium.

5. The method of claim 4 further characterized in that said inorganic oxide base material is an alumina-containing base material.

6. The method of claim 5 further characterized in that said inorganic oxide base material is alumina.

7. The method of claim 5 further characterized in that said inorganic base material is a silica-alumina composite.

References Cited

UNITED STATES PATENTS

| 3,123,491 | 3/1964 | Beaumont | 99—189 X |
| 3,255,020 | 6/1966 | Ferrell | 99—189 |

FOREIGN PATENTS

| 613,787 | 1/1961 | Canada. |

OSCAR R. VERTIZ, *Primary Examiner.*

E. C. THOMAS, *Assistant Examiner.*

U.S. Cl. X.R.

99—189; 252—441, 442, 460, 466